US009208560B2

(12) United States Patent
Wang (10) Patent No.: US 9,208,560 B2
(45) Date of Patent: Dec. 8, 2015

(54) IMAGE REGISTRATION METHOD (71) Applicant: National Taiwan University of Science and Technology, Taipei (TW)

(72) Inventor: Ching-Wei Wang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 0 days.

(21) Appl. No.: 14/289,051

(22) Filed: May 28, 2014

(65) Prior Publication Data

US 2015/0154755 A1    Jun. 4, 2015

(30) Foreign Application Priority Data

Nov. 29, 2013   (TW) ................................. 102143874

(51) Int. Cl.
*G06K 9/62*   (2006.01)
*G06T 7/00*   (2006.01)
*G06T 11/00*  (2006.01)
*G06T 3/00*   (2006.01)

(52) U.S. Cl.
CPC ............ *G06T 7/0024* (2013.01); *G06K 9/6202* (2013.01); *G06T 3/0068* (2013.01); *G06T 11/001* (2013.01)

(58) Field of Classification Search
None
See application file for complete search history.

(56) References Cited

U.S. PATENT DOCUMENTS

| | | | |
|---|---|---|---|
| 2004/0136569 A1* | 7/2004 | Daley et al. | 382/110 |
| 2008/0137080 A1 | 6/2008 | Bodzin et al. | |
| 2009/0087051 A1* | 4/2009 | Soenksen et al. | 382/128 |
| 2010/0254589 A1* | 10/2010 | Gallagher | 382/133 |
| 2012/0076390 A1* | 3/2012 | Potts et al. | 382/133 |
| 2013/0243346 A1* | 9/2013 | Cho et al. | 382/255 |
| 2015/0004630 A1* | 1/2015 | Lange et al. | 435/7.21 |

FOREIGN PATENT DOCUMENTS

| | | |
|---|---|---|
| WO | WO 03/021231 A2 | 3/2003 |
| WO | WO 2014140070 A2 * | 9/2014 |

OTHER PUBLICATIONS

Mancenko et al "A method for Normalizing Histology slides for quantitative analysis" IEEE 2009.*

* cited by examiner

*Primary Examiner* — Sean Motsinger
(74) *Attorney, Agent, or Firm* — Birch, Stewart, Kolasch & Birch, LLP (57) ABSTRACT

An image registration method for registering images into a coordinate system includes the following steps: (a) performing image normalization on a source image and generating a normalized image; (b) retrieving at least one color-deconvoluted image from color-deconvoluting the source image; (c) determining at least one image feature from the at least one color-deconvoluted image; (d) comparing the at least one image feature of the at least one color-deconvoluted image with a target image, and generating a relative matching structural feature result; and (e) transforming the normalized image into a registered image according to the matching structural feature result.

7 Claims, 9 Drawing Sheets

IMAGE REGISTRATION METHOD

BACKGROUND OF THE INVENTION

1. Field of the Invention

The present invention generally relates to an image registration method; particularly, the present invention relates to an image registration method that can increase the accuracy of image registrations.

2. Description of the Related Art

In the field of medical science, image registration is a very important process that is widely and heavily used in a majority of the planning, improvement, and assessment of surgical and radiotherapy processes. However, variations in appearance of data, image noise, and data distortions make the image registration process that much harder to complete, resulting in unstable and poor performance of conventional image registration methods.

Figure 1A:
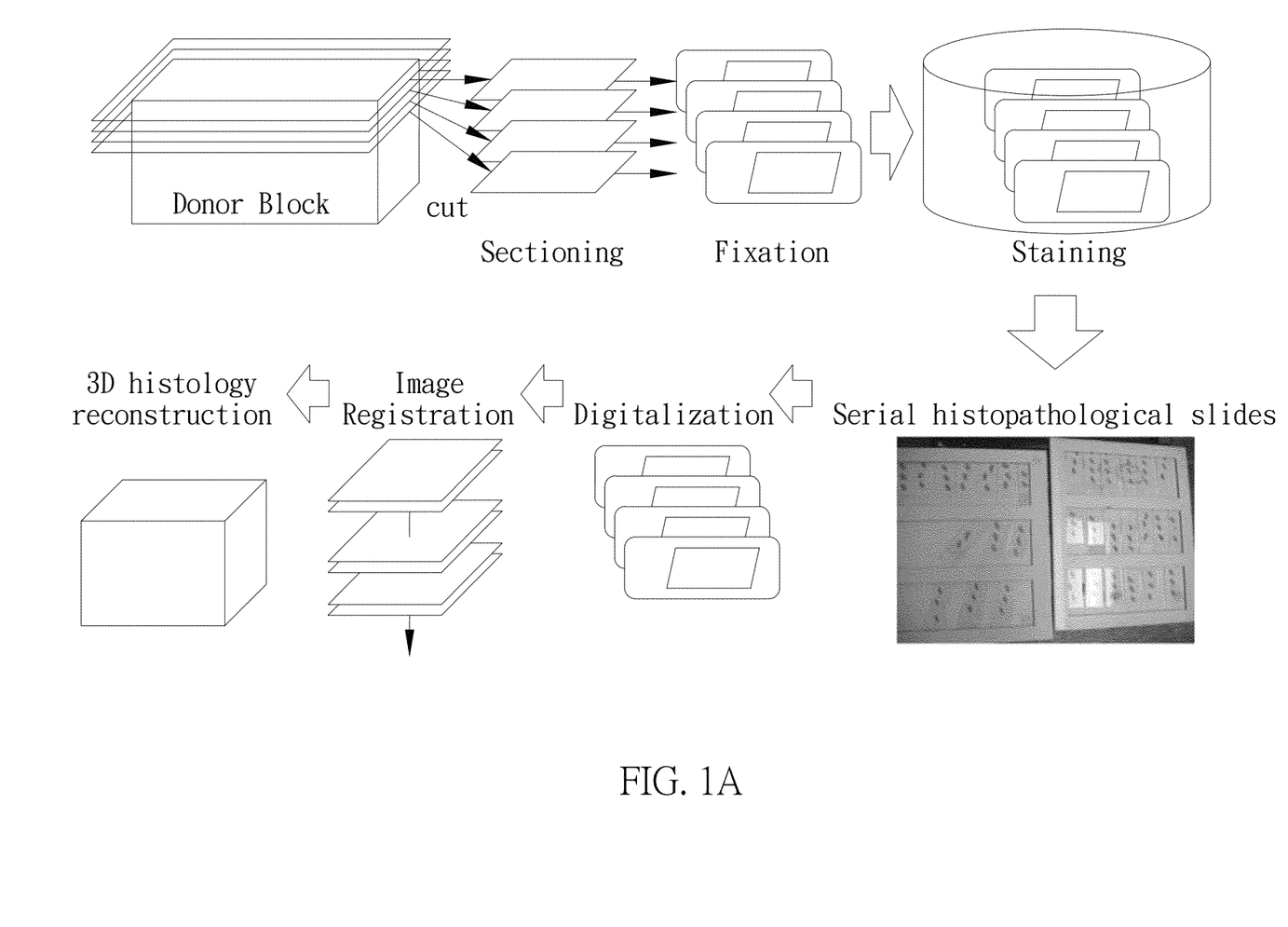
FIG. 1A is a flow chart diagram of a conventional image registration.
Figure 1B:
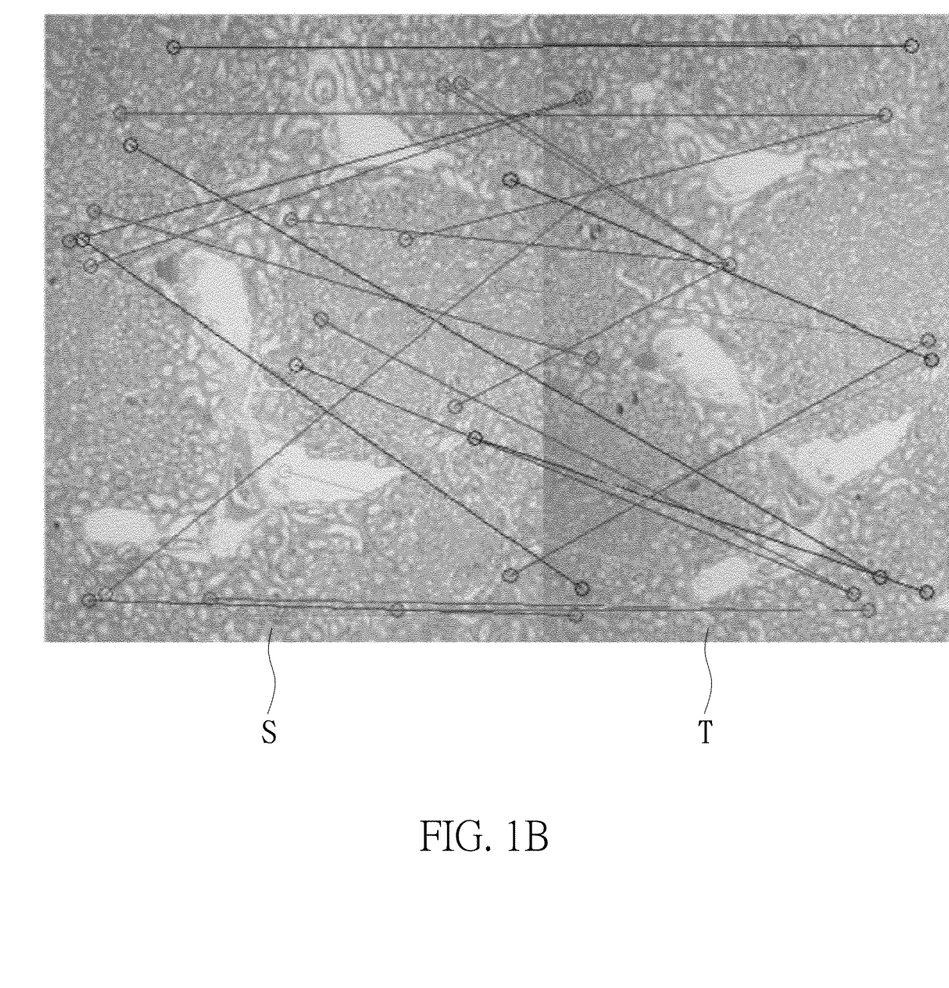
FIG. 1B is the conventional matching of relative structural features.
Figure 1C:
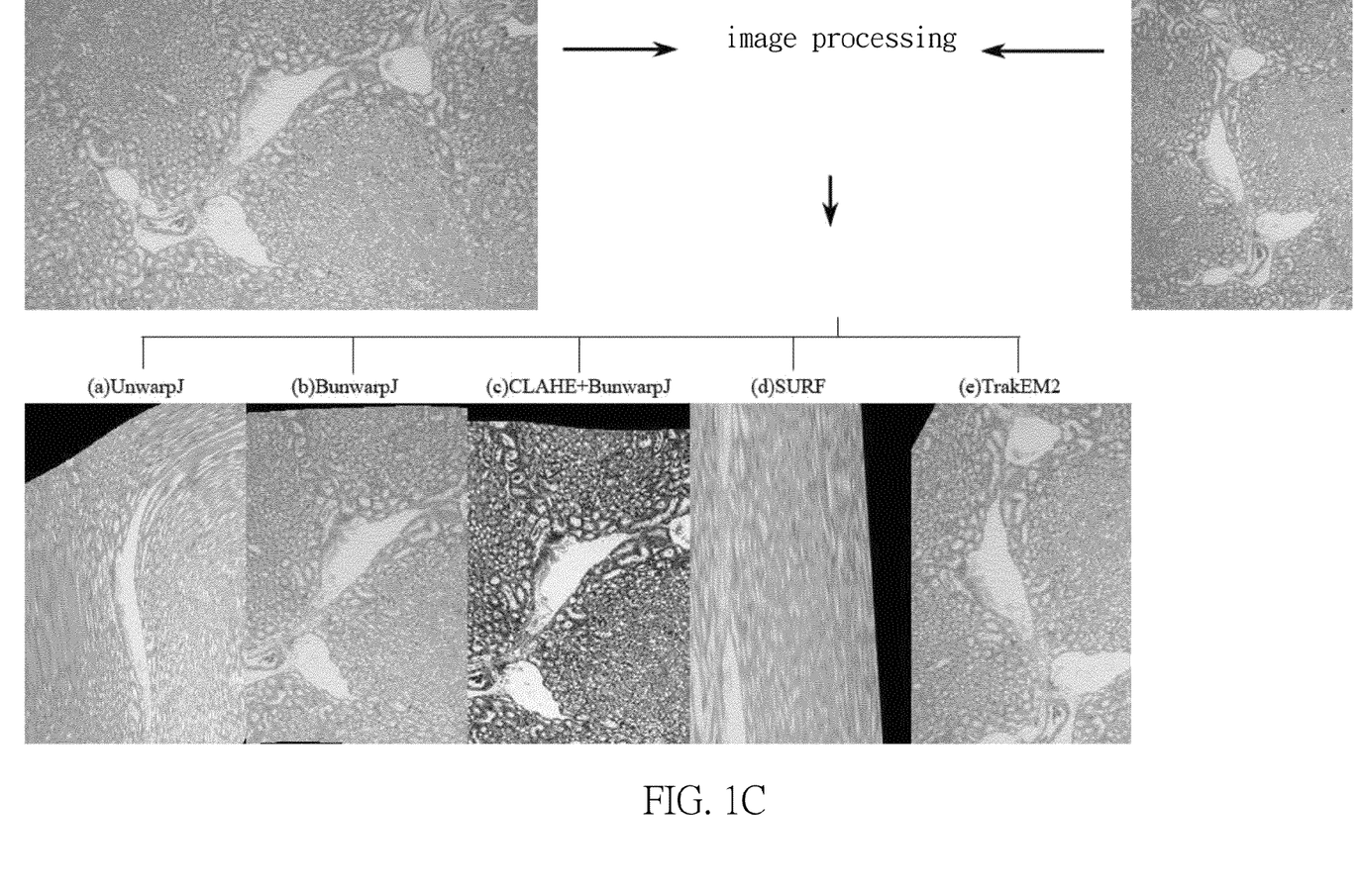
FIG. 1C is the image registration result of the conventional image registration method.

In more definite terms in referring to the pathological image of FIG. 1A as an example, a specimen will first be cut into a plurality of slices, wherein each slice is fixed on a transparent slide. Then, tissue slides will be stained according to the user's requirements. Referring to the present figure as an example, routine H&E staining is used to perform histopathological analysis. After staining, the slices are arranged in serial order and then are digitalized through image scanning. After the digitalized pathological images are image registered, three-dimensional images of the specimen may be recreated by the users from the image registered pathological images. However, as shown in FIG. 1B, with respect to relatively more image noise occurring in pathological images, the results generated by conventional image registration methods are often subpar and/or unstable. In reference to FIG. 1B as an example of performing image registration according to the conventional SURF (Speeded-up Robust Features) method, the features $P_S$ detected in the source image S have been erroneously matched to completely different features $P_T$ in the target image. When the conventional image registration method proceeds to perform image transformations on the source image S according to the detected match points ($P_S$ & $P_T$) in order to be more lined up with the structure in the target image, image source S will be transformed into an unrecognizable image due to the erroneous matching. However, even when other conventional image registration methods are employed—such as the UnwarpJ, Bunwarj, CLAHE+BunwarpJ, TrakEM2 methods of FIG. 1C—the other conventional image registration methods still cannot accurately transform the source image S to the coordinate system of the target image T. As such, a more accurate image registration method in inevitably required.

SUMMARY OF THE INVENTION

It is an objective of the present invention to provide an image registration method that can increase the detection accuracy of structural features in images.

It is another objective of the present invention to provide an image registration method that can increase the stability and speed of image registration It is yet another objective of the present invention to provide an image registration method that can accurately and autonomously execute image registration.

The present invention provides an image registration method for image registering at least one source image such that the contents thereof is under the same coordinate system. The image registration method includes the following steps: (a) performing image normalization on input images and generating normalized images; (b) retrieving at least one color-deconvoluted image from color-deconvoluting the source image; (c) determining at least one image feature from the at least one color-deconvoluted image; (d) comparing the at least one image feature of the at least one color-deconvoluted image with a target image, and generating a relative matching structural feature result; and (e) transforming the normalized image into a registered image according to the matching structural feature result.

DETAILED DESCRIPTION OF THE PREFERRED EMBODIMENT

The present invention includes an image registration method, preferably for use in an image registration system. In an embodiment, the image registration method and image registration system has application in the medical field. However, they are not restricted to being used only in the medical field. In other embodiments, the image registration method and image registration system of the present invention may be utilized in any other technical fields. Please refer to FIG. 2 of an embodiment of the image registration system 100 of the present invention. In the present embodiment, the image registration system 100 at least includes an source-image provider unit 110, an image registration unit 120, and a storage unit 130. In more concrete terms, the image registration system 100 follows a particular image registration process to transform pathological images into registerable images. The following will explain the method and system of the present invention in more detail.

Figure 2:
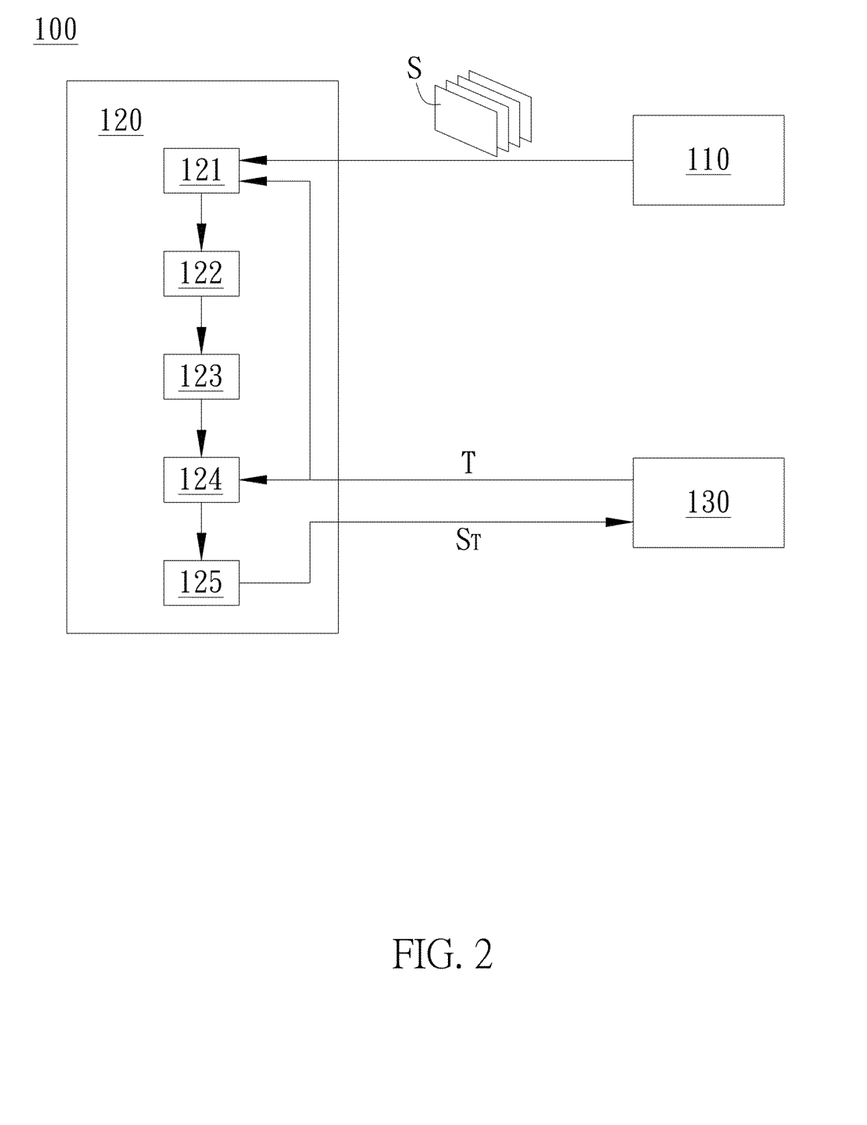
FIG. 2 is an embodiment of the image registration system of the present invention.

As shown in FIG. 2, the image registration unit 120 will receive from the source-image provider unit 110 at least one source image S. In the present embodiment, source-image provider unit 110 is an image database for storing a plurality of digitalized image files of serially arranged slides. In more definite terms, after a specimen has been sliced into a plurality of slices and then stained, the stained slices may then be scanned into digital pathology image files. These pathology image files are then stored in the source-image provider unit 110. However, in other different embodiments, the source-image provider unit 110 may be any other device, such as magnetic resonance imaging devices (MRI device), X-ray imaging devices, or any other related devices. For example, in the instance that the source-image provider unit 110 is a MRI device, the source-image provider unit 110 can directly generate the plurality of digitalized pathology images of a patient.

In the present embodiment, the image registration unit 120 transforms received source images S into images registerable in the storage unit 130 according to a specific image processing method. In the present embodiment, the storage unit 130 may be another image database different from the source-image provider unit 110. In this circumstance, the storage unit 130 primarily stores pathology images processed by the image registration unit 120. However, in other different embodiments, the storage unit 130 may be a server, computing device, or any other systems that have use for images that have undergone image registration. As shown in FIG. 2, the image registration unit 120 can further include a color deconvolution module 122, a structure-determining module 123, a feature-matching module 124, and an image transformation module 125. These modules will be explained in greater detail below with the image registration method of the present invention.

Figure 3:
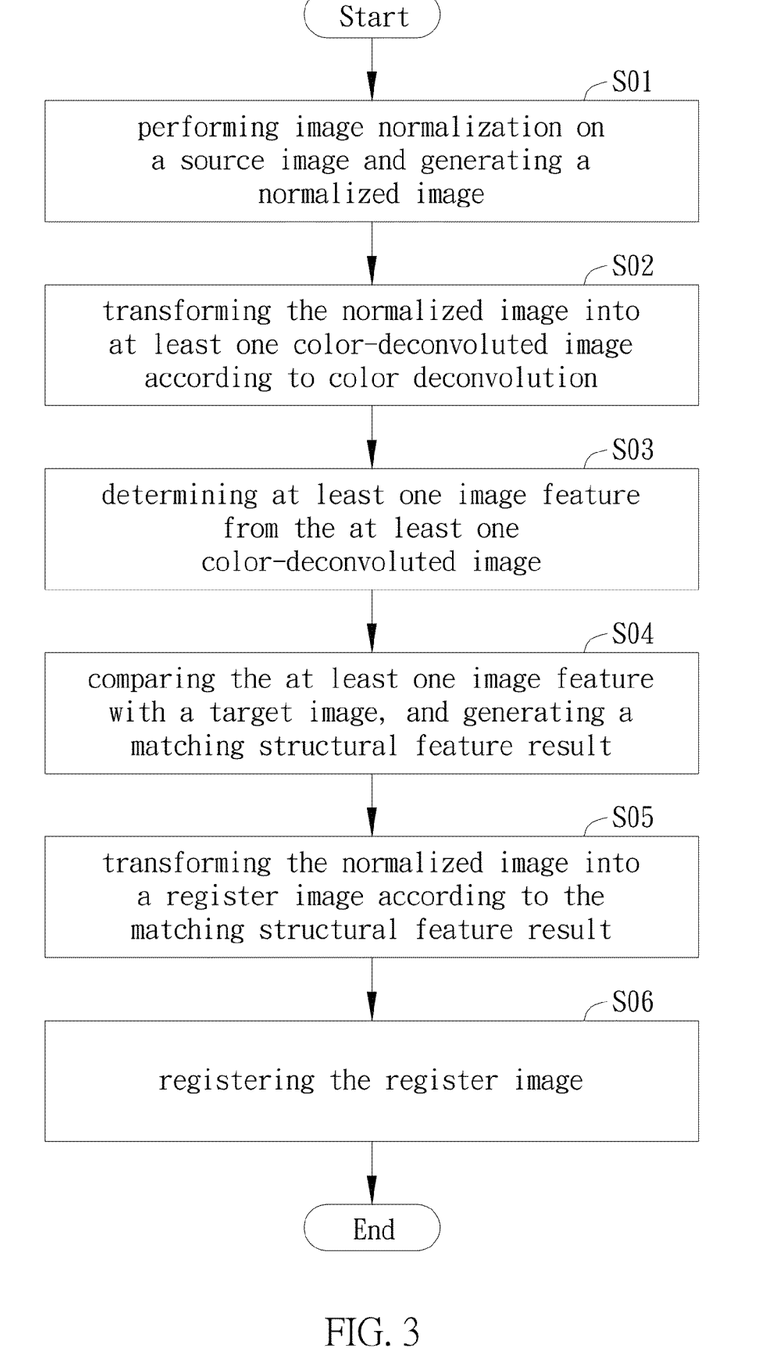
FIG. 3 is an embodiment of the flow chart diagram of the image registration method of the present invention.

Please refer to FIG. 3 of an embodiment of a flow chart diagram of the image registration method of the present invention. The image registration method includes steps S01 to S06. The following will explain the image registration method in greater detail.

Step S01 includes performing image normalization on the source image to generate a normalized image. In for definite terms in reference to FIGS. 2 and 4A, the image normalization module 121 in the image registration unit 120 will first receive one or a plurality of source images S from the source-image provider unit 110. In the present embodiment, image normalization module 121 will receive the plurality of source images S at once. Particularly, source-image provider unit 110 is able to aggregate and organize all the source image files before transmitting them together all at once to the image normalization module 121. However, in other different embodiments, source-image provider unit 110 may transmit the source images S in batches or installments over time to the image normalization module 121 according to the connection bandwidth between the source-image provider unit 110 and the image normalization module 121. In addition, before the image normalization module 121 reaches the limits of its image processing capabilities, the image registration unit 120 may also notify the source-image provider unit 110 to transmit the source images S in the above described installments to lessen the load on the image normalization module 121. In this manner, the image registration unit 120 may better control and manage the image registration process. In the present embodiment, after the image normalization module 121 receives the source image S, the image normalization module 110 will start to perform normalization on the source image S. Particularly, the image normalization module 110 can detect the brightness and/or contrast levels of the source image S, and then transform the source image S into a normalized image according to an image standard along with the detected brightness/contrast levels.

Figure 4A:
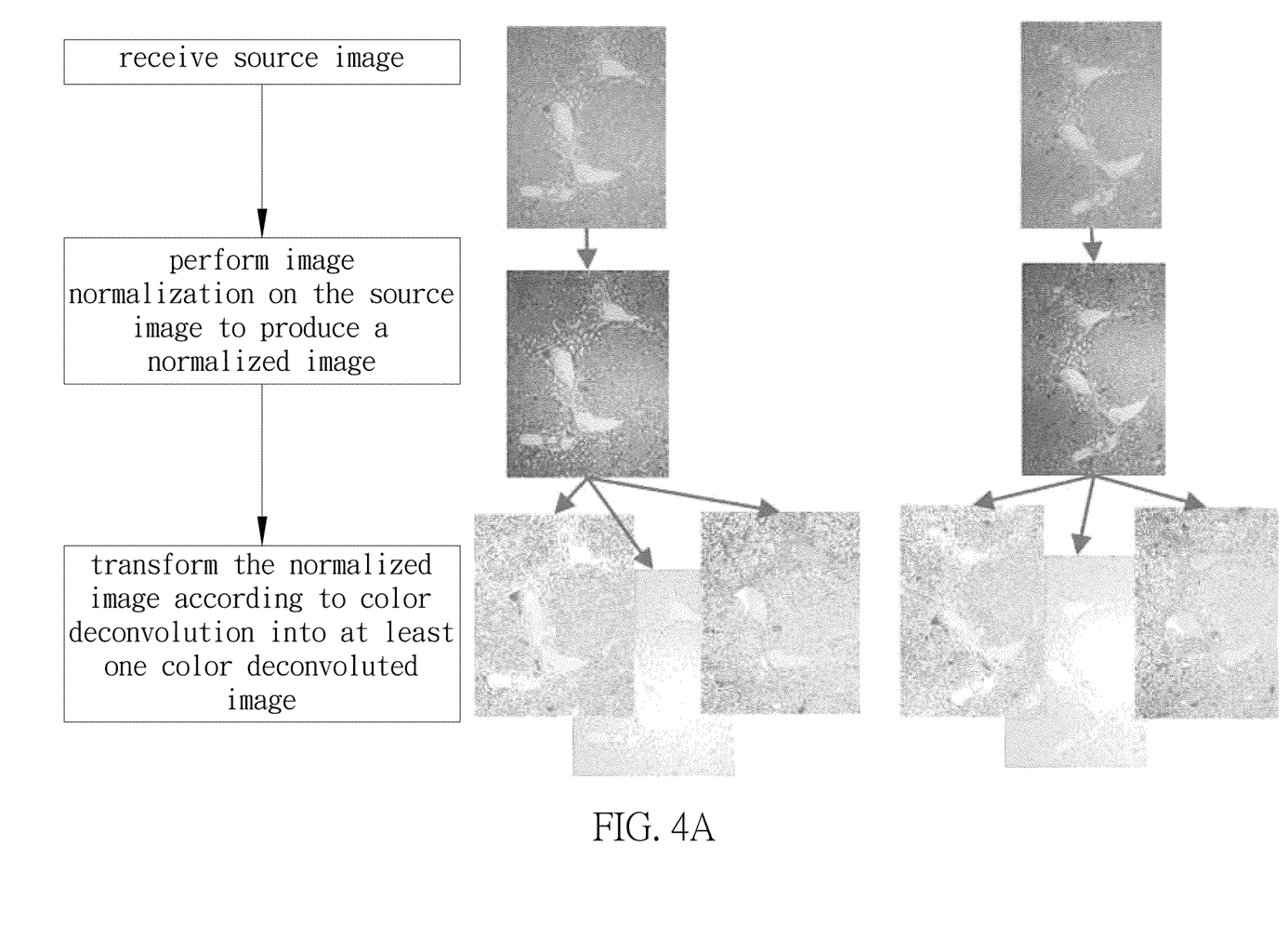
FIG. 4A is an embodiment of the flow chart of image normalization.
Figure 5:
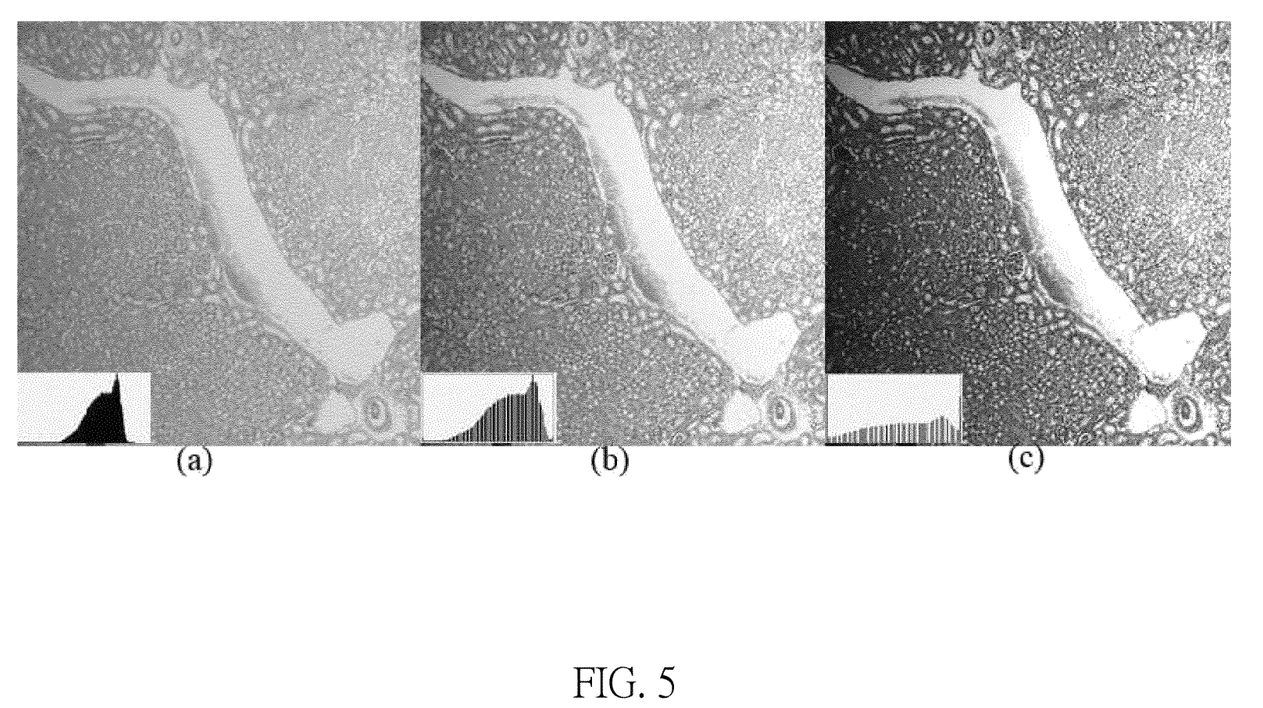
FIG. 5 is another embodiment of image normalization.

In the present embodiment, as shown in FIGS. 4A and 5, the image normalization process may be executed according to the distribution of the image histogram of the source image S. In more definite terms, and in reference to exhibit (a) and (b) of FIG. 5 as an example, the image histogram distribution of the source image S in exhibit (a) and (b) are both concentrated in the middle. In the present embodiment, the image normalization module 121 may stretch out the two tail ends of the image histogram distribution in exhibit (a) and (b) according to a default standard. In this manner, the image histogram distribution of exhibit (a) and (b) may be more uniform in line with the image histogram distribution of exhibit (c). However, in other different embodiments, users may set how the image normalization module 121 adjusts the source image S into the normalized image according to their liking. In addition, in another embodiment, the image normalization module 121 may retrieve a target image T from the storage unit 130. In the present embodiment, the target image T is a type of reference image for the image registration unit 120 to use as reference for adjusting the processing of the source image S. After receiving the target image T, the image normalization module 121 can detect the histogram image from the target image T and will accordingly set the image standard (default standard) as the detected histogram image. In this manner, all source images S can be normalized under the same standard. However, even if the image normalization module 121 does not use the histogram image distribution of target image T as a reference, the image normalization module 121 may still receive the target image T from the storage module 130. In the present embodiment, as shown in FIG. 4A, the image normalization module 121 may also perform image adjustments or image processing on both the source image S and the target image T according to the default standard.

Step S02 includes retrieving at least one color-deconvoluted image from color-deconvoluting the source image. As shown in FIGS. 2 and 4A, color deconvolution module 122 will separate the normalized image into at least one color deconvoluted image according to color deconvolution methods. In the present embodiment, the color deconvolution module 122 preferably splits the normalized image into three color deconvoluted images: red, blue, and green (RGB) color deconvoluted images. The purpose of this is to resolve the problem of identifying structures from the specimen slices after it has been stained. In the present embodiment, for instance, if the staining process utilizes red dye to stain the specimen, the red dye will be absorbed by specific cells in the specimen slice and be stained. When the color deconvolution module 122 splits the normalized image into red, blue and green color deconvoluted images, the red color deconvoluted image will represent the structures that have been stained red in the slice by the red dye (ex. cell nucleus). Meanwhile, in the present example, the green color deconvoluted image may represent the background of the image slice. Through the method of color deconvolution, the image registration system 100 may effectively decrease in large amounts the image data that needs to be processed or analyzed. At the same time, the method of color deconvolution can also make prominent the structures in the image. Therefore, by decreasing the amount of images needing to be processed or analyzed, the image registration unit 120 can more quickly complete the image processing and analyzing procedures. However, in other different embodiments, color deconvolution module 122 can separate the normalized image into color deconvoluted images of other different colors. For instance, if the specimen slice was stained with other different colors, or the source image S is retrieved from MRI devices or such related devices, the color deconvolution module 122 can adjust how the normalized image is separated into one or more different colors of color deconvoluted images according to the different situations.

Figure 4B:
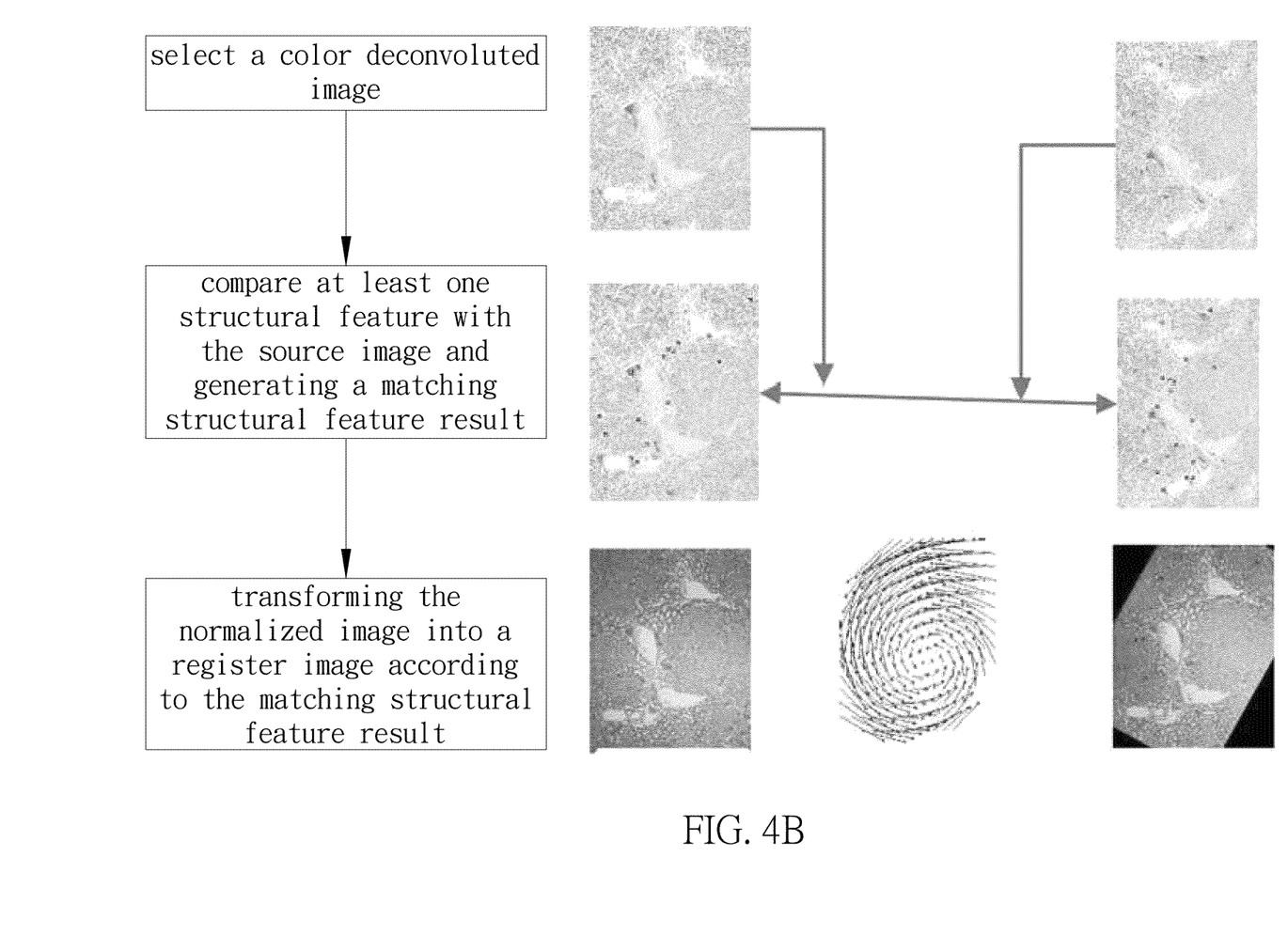
FIG. 4B is an embodiment of the flow chart of the image registration.

Step S03 includes determining at least one image feature from the at least one color-deconvoluted image. As shown in FIGS. 2, 4A and 4B, in the present embodiment, the color deconvolution module 122 select and transmit one of the one or more color-deconvoluted images from the normalized image of the source image S to the structure determining module 123. In terms of the mentioned red dye example, in the present embodiment, the structure determing module 123 will receive the red color-deconvoluted image corresponding to the normalized image of the source image S from the color deconvolution module 122. At the same time, the structure determining module 123 will receive the red color-deconvoluted image corresponding to the normalized image of the target image T from the color deconvolution module 122. In other words, the structure determining module 123 will respectively receive color deconvoluted images of the same color but corresponding to the different normalized images (source image S and target image T). In simpler terms, if the selected color deconvoluted image of the normalized image of the source image S is viewed as a first image, and the color deconvoluted image of the normalized image of the target image T is viewed as a second image, the second image preferably has the same color as the first image.

Figure 6:
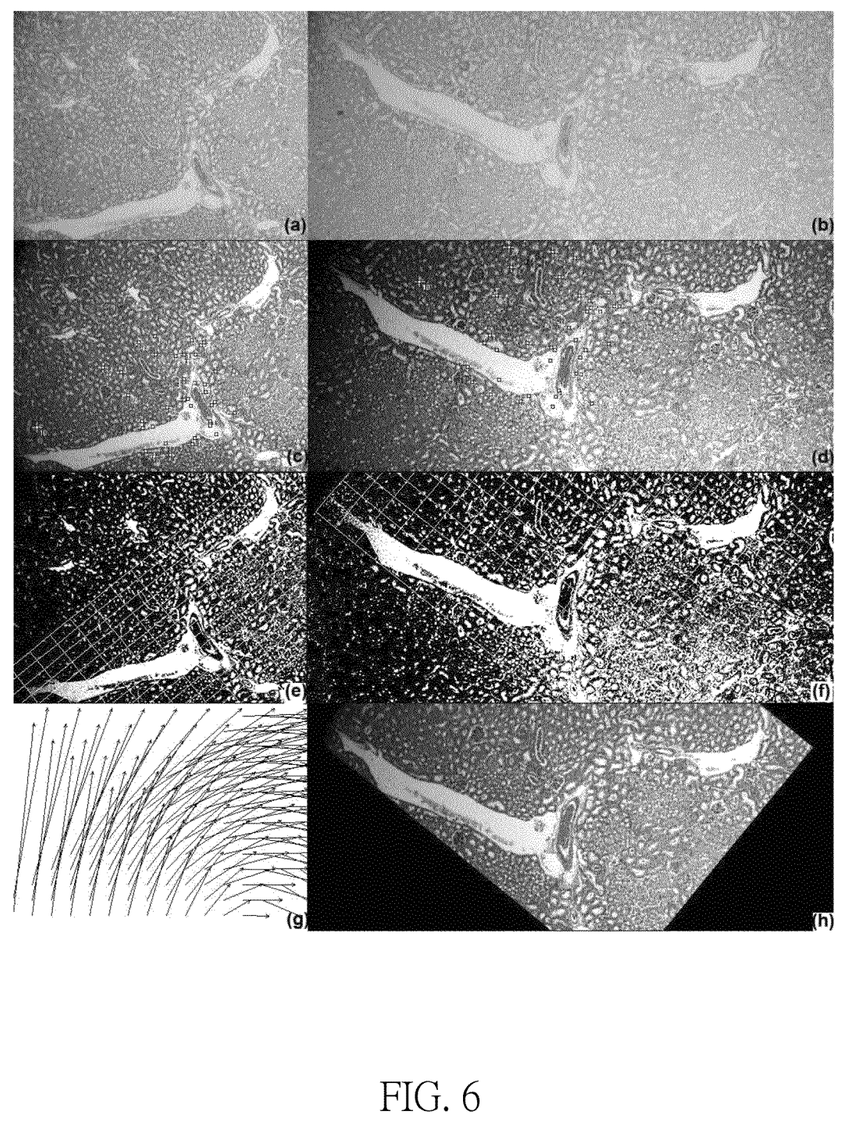
FIG. 6 is another embodiment of image registration of the present invention.

When the structure determining module 123 receives the first image and the second image, the structure determining module 123 will respectively determine at least one image feature from the first image and the second image. In the present embodiment, the image feature may be a feature of the structure. However, in other different embodiments, the image feature may be other characteristics or features. In reference to FIGS. 4B and 6 and as shown in FIG. 6, exhibit (c) and (d) are respectively the first image and the second image. In the present embodiment, the structure determining module 123 will respectively determine the image (structural) features in the first image and the second image. In reference to FIG. 6 as an example, exhibit (c) and (d) are marked with a plurality of square or round shaped labels to indicate the positions of structural features. It should be noted that since the color deconvolution process was done, the amount of image data needing to be process or analyzed by the structure determining module 123 will be far less than conventional image registration methods. Therefore, when trying to determine structural features, the image registration system 100 of the present invention will be faster than the conventional image registration method. In addition, since the amount of image data that is required to be analyzed is smaller and since any data pertaining to the background or any other info not relating to the identified structure of the image had already been disregarded in the color deconvolution process, the structure determining module 123 can more accurately identify or determine each structural feature in the image, such as cell nuclei, cell walls, and other related structural features.

Step S04 includes comparing the at least one image feature of the at least one color-deconvoluted image with a target image, and generating a relative matching structural feature result. As shown in FIGS. 4B and 6, in the present embodiment, a feature matching module 124 will receive from the structure determining module 123 the first image and the second image. According to the labels marking the positions of the one or many structural features in the first and second images by the structure determining module 123, the feature matching module 124 will compare the structural features found in the first image with the structural features found in the second image. In the present embodiment, the feature matching module 124 will compare the first image and the second image to find structural features that correspond with each other between the images. Since the images have been though normalization and color-deconvolution processes, the structures in the first image and the second image will be very clear and evident once the present step in the process has been reached. That is, there would not be any excess amount of image noise data. Therefore, the feature matching module 124 can accurately match features of the first image with corresponding features in the second image. Accordingly to the matching relationship between each structural feature, the feature matching module 124 will generate and transmit a relative matching structural feature result to an image transformation module 125.

However, in other different embodiments, the feature matching module 124 may receive the target image T from a storage unit 130. In this circumstance, the target image T received by the feature matching module 124 can include default structural feature labels. In the present embodiment, users may preemptively manually register default labels on the target image T to identify recognizable structural features and then store that target image T in the storage unit 130. Under these circumstances, the feature matching module 124 can compare the first image with the target image T received from the storage unit 130. In other words, the image registration unit 120 does not need to use modules 121-123 to perform image processing and analysis on the target image T. By having the user manually identify the structural features of image T, the image registration unit 120 can conserve system resources while completing the image registration process faster. In addition, through this method, users may at any time adjust or raise the accuracy of determining structure features by the image registration system 100.

Step S05 includes transforming the normalized image into a registered image according to the relative matching structural feature result. Particularly, the image transformation module 125 in the image registration unit 120 will perform image transformations of the normalized image of the source image S onto the coordinate system of the normalized image of the target image T according to each of the image feature matching relationship included in the relative matching structural feature result. In other words, the present invention will perform fast coarse image registration with the features as the basis. As shown in the first image of exhibit (e) and the second image of exhibit (f) in FIG. 6, the image transformation module 125 will first analyze the relationship between the structural features of the second image (ie. 1. The color deconvoluted image of the second image corresponding to the color deconvoluted image of the first image that corresponds to the target image; or 2. the target image T received from the storage unit 130) with the coordinate system of the second image. Similarly, the image transformation module 125 will also analyze the relationship between the structural features of the first image and the coordinate system of the first image. The image transformation module 125 will then use a direct matching process where the features are used as a regional basis to improve the regional registration results. In more definite terms, according to each of the matching pairs of the structural features identified by the feature matching module 124 of the first and second images as well as the analysis on the coordinate systems of the first and second images by the image transformation module 125 (as shown in FIG. 6(e) and (f)), the image transformation module 125 can generate the linear transformation relations as shown in FIG. 6(g). As shown in FIGS. 4B and 6, after the image transformation module 125 has calculated the linear transformation relations, the image transformation module 125 will transform the normalized image of the source image S corresponding to the first image onto the coordinate system of the target image T according to the linear transformation relations as shown in FIG. 6(h).

Step S06 includes registering the register image. In terms of FIGS. 2, 4B, and 6 as an example, the image registration unit 120 will transmit the register image $S_T$ to the storage unit 130 to complete image registration after the image transformation module 125 has transformed the normalized image of the source image S into the register image $S_T$.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An image registration method for image registering at least one source image to enable the images to be registered in the same coordinate system, the method comprising:
    (a) performing image normalization on a source image and generating a normalized image;
    (b) retrieving at least one color-deconvoluted image from color-deconvoluting the source image, wherein the normalized image is transformed into three color deconvoluted images according to color deconvolution, and the three color deconvoluted images are respectively a red color deconvoluted image, a blue color deconvoluted image, and a green color deconvoluted image;
    (c) selecting one of the three color deconvoluted images as a first image, and then determining at least one image feature from the first image;
    (d1) transforming a target image into at least one color deconvoluted image according to color deconvolution;
    (d2) selecting from the at least one color deconvoluted image corresponding to the first image as a second image;
    (d3) determining at least one image feature from the second image, and then setting the at least one image feature from the second image as a default structural feature;
    (d4) comparing the image feature of the first image with the default structural feature to generate the relative matching structural feature result; and
    (e) transforming the normalized image into a register image according to the matching structural feature result.

2. The image registration method of claim 1, wherein the target image includes at least a default structural feature, the step (d) further comprises:
    comparing the at least one image feature with the at least one default structure feature to determine whether the at least one image feature corresponds to the at least one default structural feature.

3. The image registration method of claim 1, wherein the step (c) further comprises:
    determining the at least one image feature from the red color deconvoluted image.

4. The image registration method of claim 3, wherein the step (d) further comprises:
    transforming the target image into at least one color deconvoluted image according to color deconvolution, hwerein the at least one color deconvoluted image includes a red color deconvoluted image.

5. The image registration method of claim 4, wherein the step (d) further comprises:
    comparing the red color deconvoluted image of the normalized image with the red color deconvoluted image of the target image to generate the relative matching structural feature result.

6. The image registration method of claim 1, wherein the step (e) further comprises registering the register image.

7. An image registration method for image registering at least one source image to enable the images to be registered in the same coordinate system, the method comprising:
    (a) performing image normalization on a source image and generating a normalized image, wherein image normalization is performed by:
        (a1) detecting a brightness level of the source image, and generating the normalized image from the source image according to an image standard and the brightness level; and
        (a2) detecting a contrast level of the source image, and increasing or decreasing the contrast level of the normalized image according to the detected contrast level of the source image;
    (b) retrieving at least one color-deconvoluted image from color-deconvoluting the source image;
    (c) determining at least one image feature from the at least one color-deconvoluted image;
    (d) comparing the at least one image feature of the at least one color-deconvoluted image with a target image, and generating a relative matching structural feature result; and
    (e) transforming the normalized image into a register image according to the matching structural feature result.

* * * * *